United States Patent [19]
Sauer

[11] 4,040,758
[45] Aug. 9, 1977

[54] SUSPENDED CEILING HANGING CLIP

[75] Inventor: Gale E. Sauer, Williamsville, N.Y.

[73] Assignee: Roblin Industries, Inc., Buffalo, N.Y.

[21] Appl. No.: 543,920

[22] Filed: Jan. 24, 1975

[51] Int. Cl.² .............................................. E04B 5/52
[52] U.S. Cl. ..................................... 403/397; 52/484;
   52/665; 52/714; 403/188; 403/353; 403/398
[58] Field of Search ................... 248/317, 327; 52/484,
   52/486, 496, 665, 712, 715, 760, 495, 714;
   403/397, 346, 188, 353, 398

[56] References Cited
U.S. PATENT DOCUMENTS

| 644,176 | 2/1900 | Johnston | 52/712 |
|---|---|---|---|
| 804,825 | 11/1905 | Brooks | 52/760 X |
| 1,023,192 | 4/1912 | Arnn | 52/760 X |
| 1,865,131 | 6/1932 | Olsen | 52/484 |
| 1,873,039 | 8/1932 | Robinson et al. | 248/327 |
| 1,984,028 | 12/1934 | Macleod | 52/760 X |
| 2,281,109 | 4/1942 | Olsen | 52/712 |
| 2,612,813 | 10/1952 | Cohn | 85/13 |
| 3,085,666 | 4/1963 | Lydard | 52/760 X |
| 3,334,465 | 8/1967 | Hoffmann | 52/484 |
| 3,445,977 | 5/1969 | Latiano | 52/715 |
| 3,640,042 | 2/1972 | Kidney | 52/496 |

FOREIGN PATENT DOCUMENTS

| 1,411,201 | 8/1965 | France | 52/484 |
|---|---|---|---|
| 298,351 | 11/1965 | Netherlands | 52/484 |
| 897,747 | 5/1962 | United Kingdom | 52/484 |

OTHER PUBLICATIONS

Architectural Record, p. 281, Aug. 1954, "Sylvan-Aire" Sylvania.

Primary Examiner—Leslie Braun
Attorney, Agent, or Firm—Christel & Bean

[57] ABSTRACT

A one piece, sheet metal hanger clip for supporting a grid system member of a suspended ceiling frame from an overhead superstructure. The hanger clip can be utilized in various structural arrangements for suspending grid system members or runners having substantially horizontal flange means for supporting ceiling tile pieces and an upstanding web means with a surmounting bead thereon, the latter being employed to cooperatively engage with the hanger clip of the present invention. In one mode of use, a tongue means protruding from the upper end of the hanger clip is adapted to be engaged within the surface of a non-metallic superstructural framing member which would be formed of wood, for example. After engaging such tongue for initial placement of the hanger clip, both hands of a workman are then free to install a nail through an appropriate hole in the hanger clip to permanently secure the hanger clip to the wooden framing member. The other end of the hanger clip includes appropriate hook means for a locking engagement with the beaded portion of the grid member. In a second mode of use, a plurality of hanger clips may be connected together in end to end fashion so as to provide an elongated hanger clip in composite form for those applications in which such a longer length hanger clip would be necessary. In a third mode of use, the hanger clip of the present invention may be placed over a structural framing member in straddling fashion and connected to the beaded portion of a grid system runner disposed therebelow. In this embodiment, hook means on each end of the hanger clip are employed for connection to the beaded portion.

7 Claims, 9 Drawing Figures

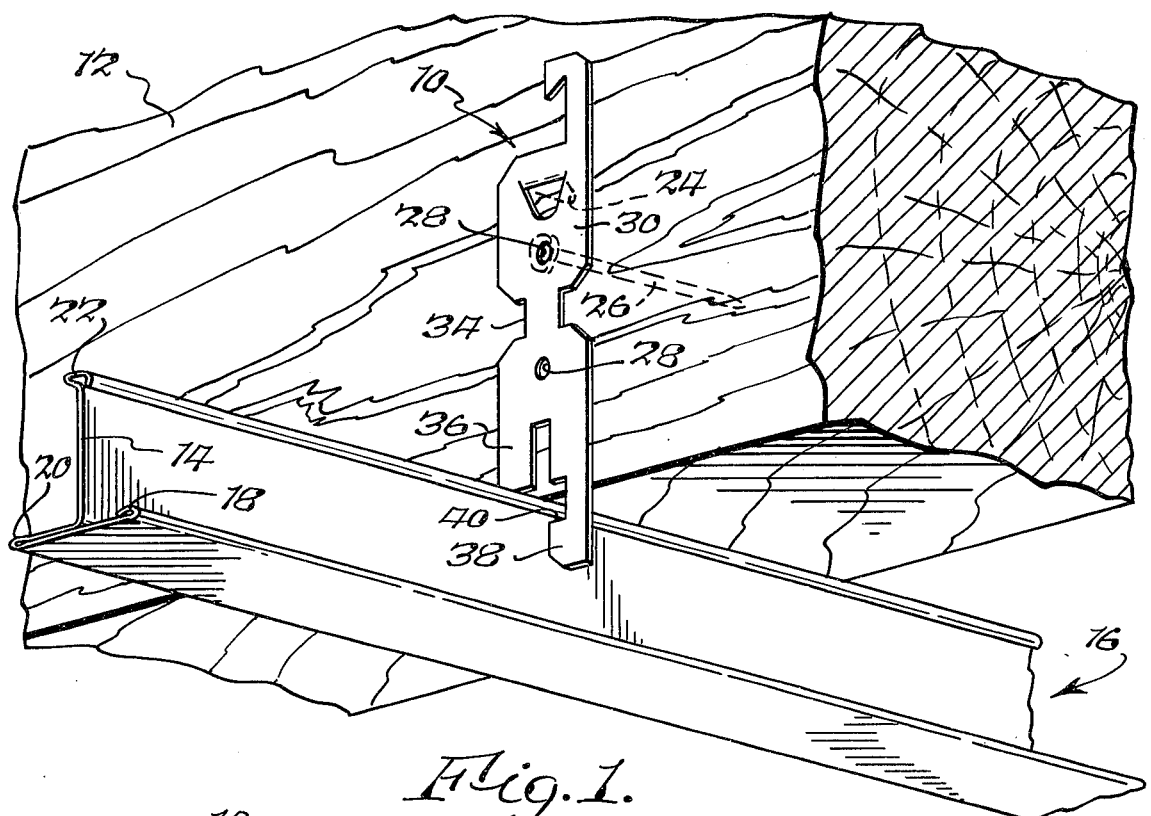
Fig. 1.
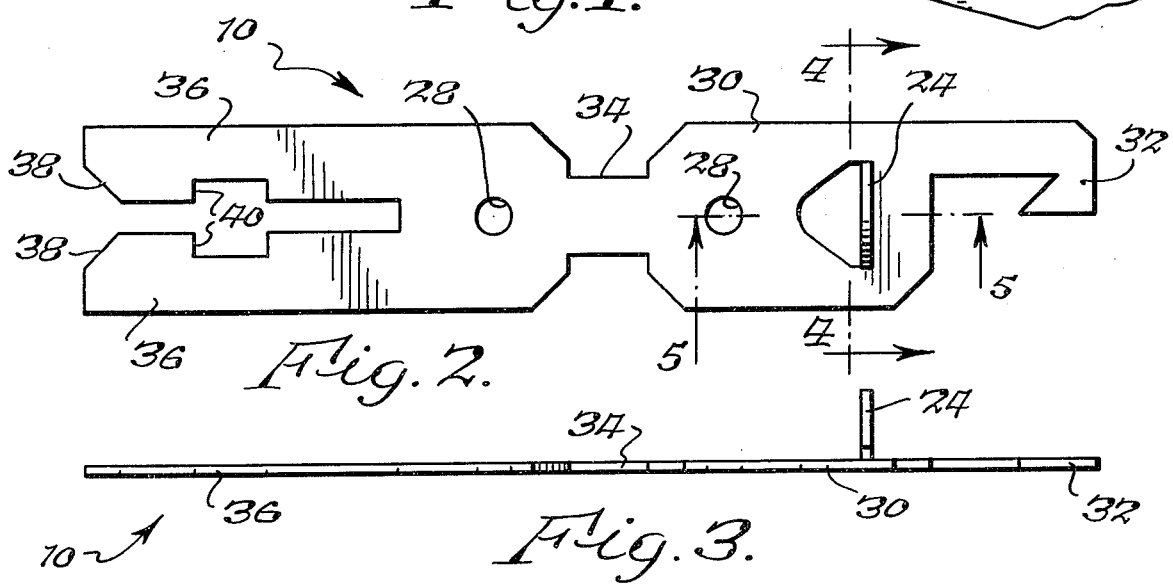
Fig. 2.
Fig. 3.
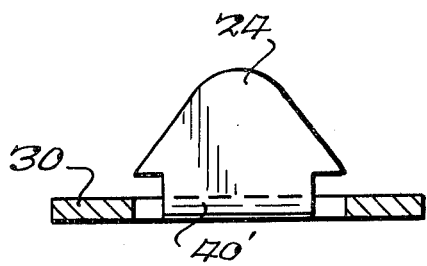
Fig. 4.
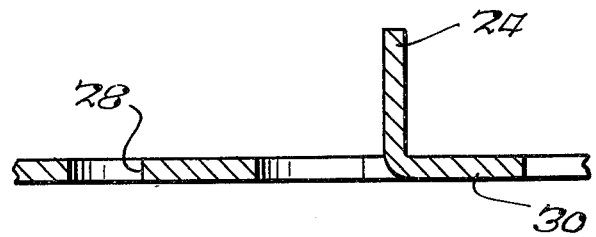
Fig. 5.

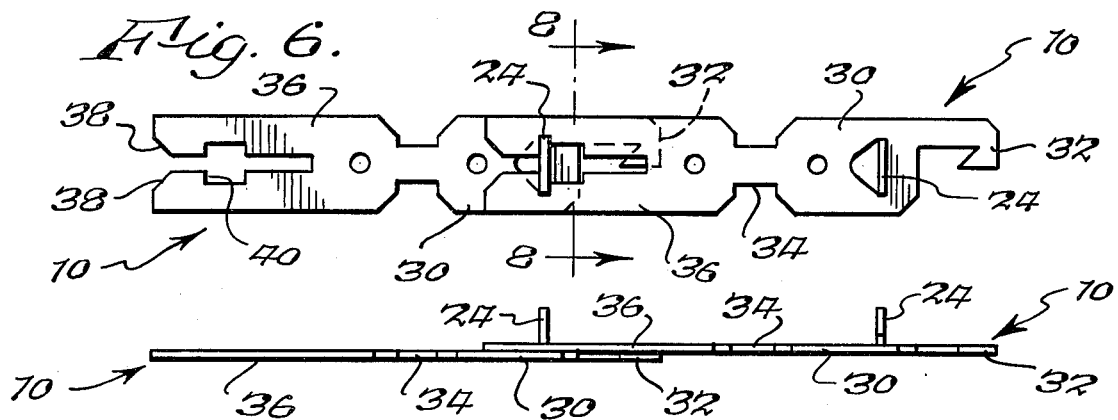
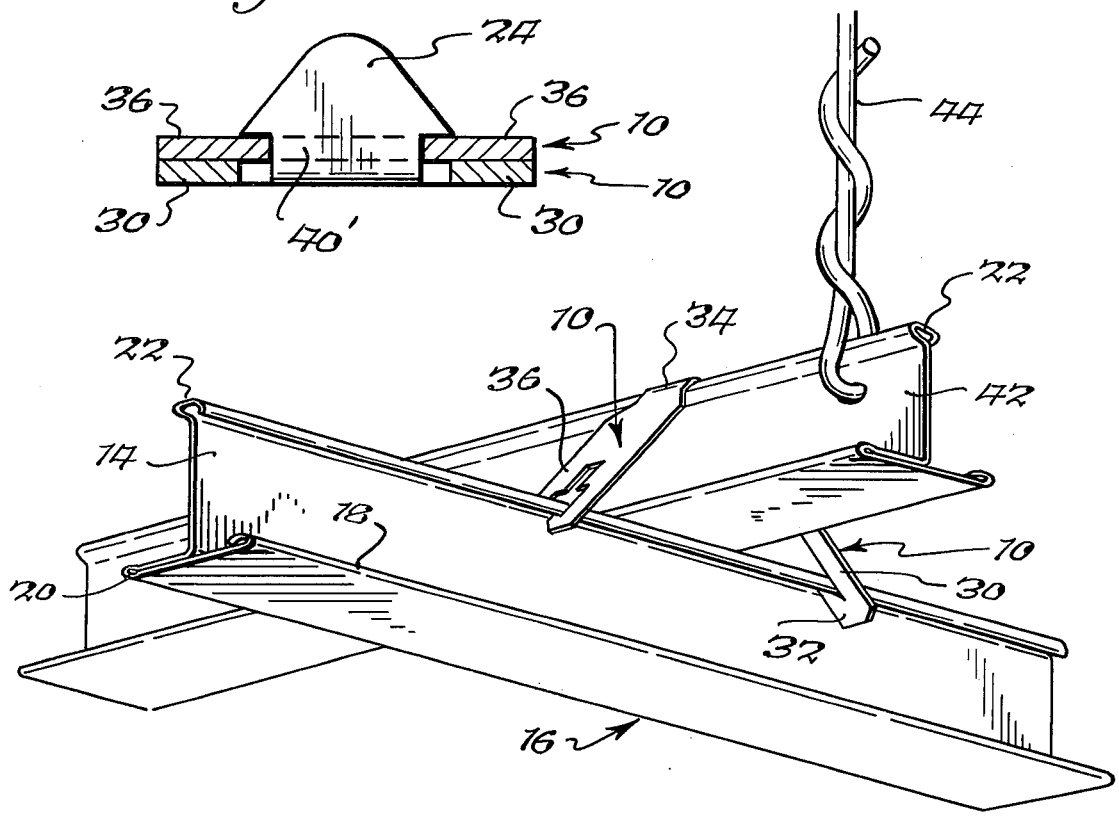

SUSPENDED CEILING HANGING CLIP

BACKGROUND OF THE INVENTION

The present invention relates generally to sheet metal hangers for use in building construction and more particularly to a hanger clip for use with inverted, T-shaped beams which in turn support block ceiling tiles.

With the advent of the widespread use of block ceiling tile in place of lathing and plaster, particularly in high rise commercial and residental building, there has arisen a definite need for improved fasteners and connectors to suspend inverted T-shaped beams more generally known as "runner" or grid system members from a superstructure for supporting such blocked ceiling tiles. In the past this has been accomplished by using wire stringers which hung from a heavy construction beam or some other element of the superstructure and which were looped through the T-shaped beams or grid members at the various intervals and wrapped or twisted to complete the attachment. More recently, various types of sheet metal clips, hangers and rods have to some extent replaced the wire stringers. While these later used devices definitely represent an improvement, many of the clips and hangers embody bolts or set screws which must be turned against a beam to complete the attachment and many others have been used as a means to which the formerly mentioned wire stringers could be attached in lieu of looping the wire directly through the inverted T-beam or runners. Assembly problems were also encountered with prior art clips wherein it was necessary for a workman to hold a hanger clip in place while attempting to nail the same into permanent securement with an overhead wooden framing member such as a rafter or the like. In addition, it has been found difficult to universally use prior art hanger clips where the vertical distances between a grid system member and the overhead superstructure varied and prior art clips were provided in only one length. In this regard the prior art clips had limited application and could not be used universally in hanging grid system members in various structural situations.

The present invention is therefore seen to represent a substantial improvement over the prior art devices discussed hereinabove.

SUMMARY OF THE INVENTION

Accordingly, one object of the present invention is to provide a new and improved hanger clip for supporting grid system members of a suspended ceiling from an overhead superstructure which can be rapidly snapped on to a grid system, member or runner and may be readily adapted to be attached to an overhead superstructure frame.

Another object of the present invention is to provide a hanger clip which may be universally utilized in various structural applications.

A further object of the present invention is to provide the aforesaid hanger clip which securely engages a grid system runner and may be moved along the length thereof after it is attached to provide proper alignment thereof with the overhead superstructure.

Still another object of the present invention is to provide a hanger clip which may be linked together with other similar hanger clips to provide a composite hanger clip of selective variable length.

Yet another object of the present invention is to provide a hanger clip which may be readily secured to wooden superstructure members or to non-metallic beam members so as to support grid system runners disposed therebeneath.

In summary, the present invention provides an elongated hanger clip formed of sheet metal having first and second end portions integrally connected one to another by an intermediate, relatively flexible connective portion. Each end of the hanger clip includes hook means which is adapted to lockingly engage the beaded, upstanding web portion of an inverted T-shaped grid system runner. One end of the hanger clip includes a tongue means protruding outwardly from the surface thereof which may be forced to penetrate and engage a wooden superstructure member for temporary placement of the hanger clip. In this manner, a workman's hands are free to easily hammer a nail through the hanger clip to permanently secure the clip to the wooden member. In addition, the aforesaid tongue means includes a reduced neck portion adjacent to the surface of the clip end which may be engaged by the hook means on the end of another clip. In this manner, a plurality of hanger clips may be linked together in end-to-end manner to form a composite clip of desired length which could be installed as described above.

A third manner of use of the hanger clip of the present invention involves placing the clip in a straddling disposition over a superstructure member so that the hook means on each end of the hanger clip lockingly engage the beaded portion of a grid system runner disposed below the superstructure member so that the former is supported from the latter.

The foregoing and other objects, advantages and characterizing features of the present invention will become clearly apparent from the ensuing detailed description of an illustrative embodiment thereof taken together with the accompanying drawings wherein like reference characters denote like parts throughout the various views.

BRIEF DESCRIPTION OF THE DRAWINGS

FIG. 1 is a fragmentary, perspective view of an inverted T-shaped grid system runner as supported from a wooden superstructural member by the hanger clip of the present invention;

FIG. 2 is a top plan view of the hanger clip constituting the present invention;

FIG. 3 is a side elevational view of the clip shown in FIG. 2;

FIG. 4 is a transverse view partially in section of the tongue means and reduced neck portion associated therewith as taken about on line 4—4 of FIG. 2;

FIG. 5 is a fragmentary side elevational view partly in section of the tongue means of a hanger clip taken about on line 5—5 of FIG. 2;

FIG. 6 is a top plan view of two hanger clips as disclosed in the present invention linked together in end-to-end manner.

FIG. 7 is a side elevational view of the linked hanger clips shown in FIG. 6.

FIG. 8 is a transverse view partly in section of two linked hanger clips as taken about on line 8—8 of FIG. 6; and FIG. 9 is a perspective view of a grid system runner being supported from an overhead structural member over which the hanger clip of the present invention is in straddling disposition for engaging the beaded portion of the lower grid runner at both ends of the hanger clip.

DETAILED DESCRIPTION OF A PREFERRED EMBODIMENT

Referring now in detail to the illustrative embodiment depicted in the accompanying drawings, there is shown in FIG. 1 a hanger clip generally designated 10 attached to a wooden framing member of superstructure member 12 at one end and to the upstanding beaded web portion 14 of a grid system member or runner 16 at its other end. The grid member 16 is of a type well known in the prior art for supporting block ceiling tiles by means of the horizontally disposed flange portions 18 and 20 from which the upstanding web 14 extends wherein the latter is surmounted by the expanded bead means 22. As shown in dotted lines in FIG. 1, a tongue 24 on the upper end of the clip engages the side of overhead beam 12 while a nail 26 is hammered through an aperture 28 in the clip for permanently fastening the hanger clip to the beam 12.

As shown in detail in FIG. 2, the hanger clip includes on one end a planar web 30 from which the tongue means 24 protrudes at an angle so as to be substantially perpendicular thereto. In addition, a J-shaped hook means 32 is provided as an extension to the end portion of the clip at a point most distal from the other end of the clip. As previously stated, the aperture 28 constitutes a fastening means for receiving a nail therethrough for securing the hanger clip to a wooden or non-metallic structural framing member capable of receiving a nail-type means. An alternative fastening means aperture 28 is also provided in the other end of the clip for similar employment if desired or if necessary. The other end of the clip is connected to the first end by a flexible connective portion 34 to be more fully discussed hereinbelow. The connective portion 34 is narrower in width than either of the ends of the clip so as to be relatively flexible with respect to either of the end portions. A hook means is also provided on this second end of the clip which comprises a pair of bifurcated snap acting legs 36 disposed on the portion of such second end at a point most distal from the first end discussed. The outside edge of the legs are provided with a sloped surface 38 and internal cutouts 40 shown in FIG. 2.

In utilizing the aforesaid hanger clip, three manners of applying it in suspended ceiling structures are shown in FIGS. 1, 6 and 9. As shown in FIG. 1, the lower end of the clip 10 is adapted to be snap fitted over the beaded portion 22 of runner 16. The sloped camming surfaces 38 on the clip facilitate temporary spreading of legs 36 so that the bead 22 is snapped into the cutouts 40 which form the hook means on the lower portion of the clip. In affixing the clip in position on the overhead structural frame member 12, a workman would first adjust the clip in an appropriate position on the side thereof and press the tongue means 24 into the side portion to locate the clip in such position. In this manner, a workman has both hands free so that he may easily hammer a nail means 26 through one or both of the fastening means apertures 28 for permanently securing the hanger clip to the beam 12. This greatly simplifies the assembly procedures in which a workman otherwise would have to try and hold the clip in position while at the same time holding a nail in position and trying to hammer the nail, all at the same time.

As shown in FIG. 6, a composite clip may be formed by joining two or more hanger clips 10 in end-to-end manner. As shown in FIG. 6, this may be accomplished by snapping the bifurcated legs of one hanger clip over the reduced neck portion 40 of tongue means 24 of another hanger clip, the reduced neck portion being shown in detail in FIG. 4. It can be easily appreciated by one skilled in the art that any number of hanger clips could be successively linked together in axial alignment with one another with the resulting composite clip having one end including bifurcated legs 36 and an opposite end comprising a J-shaped hook means 32. It is further understood that in employing either a single clip 10 or multiple clips in a composite form as shown in FIG. 6 in a vertical hanging disposition as shown in FIG. 1, that the J-shaped hook means 32 is in essence superfluous but is provided to increase the flexibility of utilizing the clip as will be described in the manner of use shown in FIG. 9.

As illustrated in FIG. 9, a single hanger clip 10 is disposed to straddle a grid system member 42 which as shown is suspended from an overhead structure by a wire means 44. The clip 10 straddles the beam 42 at its connective portion 34 which, being narrower than the remainder of the clip structure, is inherently more flexible and can be easily conformed to bend over the beam 42 as desired. In this manner of use the end of the clip having bifurcated legs 36 is snapped onto beaded portion 22 which surmounts an upstanding web 14 of a runner for a grid system as described in FIG. 1. In this application, the J-shaped hook means 32 on the other end of the hanger clip is engaged under the lip of the bead 22 so as to affirmatively retain the grid member 16 in a supported disposition with respect to the beam member 42. Although only one hanger clip 10 is shown in the application in FIG. 9, it is within the scope of this invention that a composite hanger clip as depicted in FIG. 6 could be utilized in the FIG. 9 situation should it be necessary due to the height of beam 42 or for a desired separation between beam 42 and runner 16. As further shown in FIG. 9, the beam 42 and runner 16 are essentially perpendicular or orthogonal with respect to one another but due to the flexibility of the clip structure and a certain degree of flexibility in the connection between the hook means 36 and 32 and beaded portion 22 of the runner, a runner 16 could be supported from a beam 42 without being strictly perpendicular thereto.

From the foregoing, it is apparent that the objects of the present invention have been fully accomplished. As a result of this invention, a hanger clip for suspended ceiling frame structures is provided which can be rapidly engaged between a grid system for supporting ceiling tiles and an overhead superstructure frame. The primary importance is the fact that a single hanger clip configuration may be universally used in various structural situations. It is easily installed by an assembly workman, can be varied in length to suit any particular situation and can be flexed to straddle overhead beams to engage and support grid runners located therebelow.

I claim:

1. In combination, a first grid system member having an upstanding web portion surmounted by a longitudinal bead means, a second grid system member disposed above said first grid member, and a hanger clip for supporting said first grid member from said second grid member, said hanger clip comprising:

a first end, said first end having a substantially planar web means and a tongue means protruding outwardly from said web means wherein said tongue means is substantially perpendicular to the plane of said web means, is transversely centered thereon and includes a reduced neck portion adjacent to said web means for connection thereto, said first end further including hook means adapted for locking engagement with said bead means of said first grid member and a second end, said second end being integrally connected to said first end and having hook means adapted for locking engagement with said first grid member, said hook means comprising a pair of bifurcated, snap acting legs disposed on the portion of said second end most distal from said first end for snap locking engagement on said longitudinal bead means of said first grid system member, said clip further including a flexible connective portion between said ends thereof wherein said flexible connective portion is disposed to straddle said second grid member and said hook means on said first and second ends lockingly engage said bead means of said first grid member on opposite sides of said second grid member and therebelow so that said first grid member is supported from said second grid member.

2. The combination as set forth in claim 1 wherein said hook means on said first end comprises a J-shaped extension on the portion of said first end most distal from said second end.

3. The combination as set forth in claim 1 wherein said flexible connective portion is narrower in width than said first and second ends to increase the flexibility thereof and to thereby facilitate the mounting of said clip in a straddling disposition over said second grid member.

4. The combination as set forth in claim 3 wherein said first and second grid members are disposed substantially perpendicular to one another.

5. A hanger clip adapted to support a grid system member from a structural framing member, said hanger clip comprising:

a first end, said first end having a substantially planar web means and a tongue means protruding outwardly from said web means wherein said tongue means is substantially perpendicular to the plane of said web means, is transversely centered thereon so as to be inwardly spaced from the edge thereof and includes a reduced neck portion adjacent to said web means for connection thereto, and a second end, said second end being integrally connected to said first end and having hook means adapted for locking engagement with the grid system member, said hook means comprising a pair of bifurcated, snap acting legs substantially co-planar with said second end and disposed on the portion of said second end most distal from said first end for snap locking engatement on a grid system member having a beaded portion for cooperative engagement with said snap acting legs, and at least one of said ends having a fastening means for permanently fastening said hanger clip to the structural framing member and wherein said tongue means is adapted to be engaged within the surface portion of the structural framing member adjacent to said first end web means for initially retaining such hanger clip in a mounted position prior to engagement of said fastening means.

6. A hanger clip as set forth in claim 5 wherein said fastening means comprises an aperture defined in at least one of said hanger clip ends for receiving a nail hammered therethrough and into the structural framing member.

7. In combination, a plurality of hanger clips adapted to support a grid system member from a structural framing member, each said hanger clip comprising:

a first end, said first end having a substantially planar web means and a tongue means protruding outwardly from said web means wherein said tongue means is substantially perpendicular to the plane of said web means, is transversely centered thereon and includes a reduced neck portion adjacent to said web means for connection thereto, and a second end, said second end being integrally connected to said first end and having hook means adapted for locking engagement with the grid system member, said hook means comprising a pair of bifurcated, snap acting legs disposed on the portion of said second end most distal from said first end for snap locking engagement on a grid system member having a beaded portion for cooperative engagement with said snap acting legs, and at least one of said ends having a fastening means for permanently fastening said hanger clip to the structural framing member and wherein said tongue means is adapted to be engaged within the surface portion of the structural framing member adjacent to said first end web means for initially retaining said hanger clip in a mounted position prior to engagement of said fastening means wherein said hanger clips are linked together in an end to end manner with said snap acting legs of one hanger clip engaging said reduced neck portion of said tongue of another hanger clip whereby said hanger clips are locked together in axial alignment.

* * * * *